(12) United States Patent
Wang et al.

(10) Patent No.: US 9,053,391 B2
(45) Date of Patent: Jun. 9, 2015

(54) SUPERVISED AND SEMI-SUPERVISED ONLINE BOOSTING ALGORITHM IN MACHINE LEARNING FRAMEWORK

(75) Inventors: Fan Wang, Stanford, CA (US); Xinyu Xu, Vancouver, WA (US); Chang Yuan, Vancouver, WA (US); Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 305 days.

(21) Appl. No.: 13/085,329

(22) Filed: Apr. 12, 2011

(65) Prior Publication Data

US 2012/0263376 A1    Oct. 18, 2012

(51) Int. Cl.
G06K 9/62    (2006.01)

(52) U.S. Cl.
CPC ............ G06K 9/6256 (2013.01); G06K 9/6262 (2013.01)

(58) Field of Classification Search
CPC . G06K 9/6218; G06K 9/6228; G06K 9/6256; G06K 9/66; G06T 7/0081
USPC ............... 382/160, 159, 173, 128; 706/12, 54
See application file for complete search history.

(56) References Cited

U.S. PATENT DOCUMENTS

| | | | |
|---|---|---|---|
| 7,024,033 B2 | 4/2006 | Li et al. | |
| 7,533,019 B1 | 5/2009 | Hakkani-Tur et al. | |
| 7,562,017 B1 | 7/2009 | Hakkani-Tur et al. | |
| 7,562,060 B2 | 7/2009 | Sindhwani et al. | |
| 7,587,064 B2 | 9/2009 | Owechko et al. | |
| 7,702,596 B2 | 4/2010 | Tu et al. | |
| 7,761,182 B2 | 7/2010 | Gallarda et al. | |

FOREIGN PATENT DOCUMENTS

EP    2164041 A    3/2010

OTHER PUBLICATIONS

Polikar et al: "Learn++: An Incremental Learning Algorithm for Supervised Neural Networks", IEEE 2001.*
Viola et al: "Rapid object detection using a boosted cascade of simple features", IEEE 2001.*
R. Polikar et al., "Learn++: An Incremental Learning Algorithm for Multilayer Perceptron Networks," Proceedings of 2000 IEEE International Conference on Acoustics, Speech, and Signal Processing 2000, vol. 6, 2000, pp. 3414-3417.
T. Kidera, "An Incremental Learning Algorithm of Ensemble Classifier Systems," Proceedings of International Joint Conference on Neural Networks 2006, Jul. 16-21, 2006, pp. 3421-3427.

(Continued)

*Primary Examiner* — Ruiping Li
(74) *Attorney, Agent, or Firm* — Chernoff Vilhauer McClung & Stenzel, LLP

(57) ABSTRACT

A method for classification of samples comprising providing a trained statistical model based upon a set of initial samples. Receiving a set of first samples and training a first statistical model base upon the first set of samples, where the first statistical model is of the same class as the trained statistical model. Receiving a set of second samples and training a second statistical model base upon the second set of samples, where the second statistical model is of the same class as the trained statistical model. The trained statistical model, the first statistical model, and the second statistical model, being independent of each other and collectively used to classify another sample.

10 Claims, 8 Drawing Sheets

(56) References Cited

OTHER PUBLICATIONS

N. Ueda, "Ensemble Learning," IPSJ Transactions on Computer Vision and Image Media, vol. 46, Oct. 15, 2005, 12 pgs.

International Search Report mailed Jul. 10, 2012 for PCT International Application No. PCT/JP2012/060391, Sharp Kabushiki Kaisha, 5 pgs.

J. Friedman et al., "Additive Logistic Regression: A Statistical View of Boosting," The Annals of Statistics, vol. 28, No. 2, 2000, pp. 337-407, Part 1 of 2.

J. Friedman et al., "Additive Logistic Regression: A Statistical View of Boosting," The Annals of Statistics, vol. 28, No. 2, 2000, pp. 337-407, Part 2 of 2.

J. Friedman et al., "Additive Logistic Regression: a Statistical View of Boosting," Aug. 20, 1998, 36 pgs.

S. Goldman et al., "Enhancing Supervised Learning with Unlabeled Data," In Proc. the 17th International Conference on Machine Learning, 2000, 8 pgs.

J.R. Quinlan, "Induction of Decision Trees," Machine Learning, vol. 1, No. 1, 1986, pp. 81-106.

S.P. Lloyd, "Least Squares Quantization in PCM," IEEE Transactions on Information Theory, vol. 28, No. 2, 1982, pp. 129-137.

N.C. Oza et al., "Online Bagging and Boosting," In Proc. Artificial Intelligence and Statistics, 2001, 6 pgs.

\* cited by examiner

SUPERVISED AND SEMI-SUPERVISED ONLINE BOOSTING ALGORITHM IN MACHINE LEARNING FRAMEWORK

CROSS-REFERENCE TO RELATED APPLICATIONS

Not applicable.

BACKGROUND OF THE INVENTION

The present invention relates to online learning of a classifier in a machine learning framework that includes supervised and semi-supervised online learning algorithms in a machine learning framework.

Such classifiers may be trained using training samples, and then used in a so-called testing or prediction stage, to classify test samples. For example, such classifiers may be used in an automated factory inspection application to detect defects in an image of a product. In this case, a "sample" may consist of a set of data derived from an image or pixels in a region of the image, and the task of the classifier is to classify "sample" as "defect" (positive class) or "non-defect" (negative class). As another example, such classifiers may be used to classify defects into different categories.

Machine learning applications usually include two stages: training stage and prediction stage. In the training stage, traditionally all training samples are available as a batch at the beginning; a statistical model can then be trained based on the training samples. In the prediction stage, the statistical model obtained from the training stage is then used to classify new samples into different categories. However, in some machine learning tasks, not all the training samples are available at the initial training stage. More samples will be acquired and may be labeled as time goes on. It is desirable to use this new information to refine and improve the classifier for future usage. In some other applications, the data properties might be changing over time, or even not generated from any distribution. The model trained with the initial samples can only accommodate the initial properties, so it might become useless as new samples arrive over time.

One way of solving this problem would be re-training the model with all samples including the initial samples and the newly obtained samples. However, re-training from scratch will usually be time-consuming, and it's not efficient to perform the re-training frequently in an online application. Therefore, a mechanism is desirable such that the model can be updated by the newly obtained samples in an online fashion during the prediction stage without complete re-training.

Lots of statistical models can be used as the classifier including Normal Support Vector Machines, Decision Trees, Boosted Decision Trees and Neural Networks. The Boosted Decision Tree (or Boosting Tree) may be the statistical model of the classifier. Thus each of the types of statistical models may be generally referred to as a respective class.

Boosting is based on the use of an ensemble of weak classifiers that is not constrained to specific classifiers. In a boosting algorithm, a weak classifier is trained with respect to the samples and the associated weights. At each iteration, a weak classifier is added to form a final strong classifier. The weak classifiers are typically weighted by their accuracy. After a weak classifier is added, the samples are reweighted: the weights of the misclassified samples will be increased, and the samples that are classified correctly will have decreased weights. Weak classifiers that are subsequently added will be trained based on the re-weighted samples, focusing more on the misclassified samples.

The weak classifier may be in the form of a Decision Tree (DT). Decision Tree (DT) is a binary tree (i.e. tree where each non-leaf node has exactly 2 child nodes). The training and prediction of the Decision Tree (DT) is described as follows.

Training Decision Trees. The tree is built recursively, starting from the root node. The whole training data (feature vectors and the responses) are used to split the root node. In each node the optimum decision rule (i.e. the best "primary" split) is found based on some criteria (gini "purity" criteria is used for classification). Then, if necessary, the surrogate splits are found that resemble at the most the results of the primary split on the training data; all data are divided using the primary and the surrogate splits (just like it is done in the prediction procedure) between the left and the right child node. Then the procedure recursively splits both left and right nodes. At each node the recursive procedure may stop (i.e. stop splitting the node further). When the tree is built, it may be pruned using cross-validation procedure, if need. That is, some branches of the tree that may lead to the model overfitting are cut off. Normally, this procedure is only applied to standalone decision trees, while tree ensembles usually build small enough trees and use their own protection schemes against overfitting.

Predicting with DT: to reach a leaf node, and thus to obtain a response for the input feature vector, the prediction procedure starts with the root node. From each non-leaf node the procedure goes to the left, or to the right based on the value of a certain variable. If the value of the variable is less the threshold This pair is called split. Once a leaf node is reached, the value assigned to this node is used as the output of prediction procedure.

The foregoing and other objectives, features, and advantages of the invention may be more readily understood upon consideration of the following detailed description of the invention, taken in conjunction with the accompanying drawings.

DETAILED DESCRIPTION OF THE PREFERRED EMBODIMENT

The boosting technique may supplement the training on an image by image basis, or group of images by group of images basis, by expanding the model. Suppose with the batch of initial training samples, an ensemble of weak classifiers has already been obtained, then this ensemble can be expanded to a larger one as new training samples arrive. With the initial training samples, a model $C_0$, which is an ensemble of weak classifiers $L_i^0$, i=1, . . . M, is trained. The prediction of $C_0$ on a testing sample x may be made by a weighted combination of the prediction of each weak classifier:

$$C_0(x) = \sum_{i=1}^{M} w_i^0 L_i^0(x),$$

in which $w_i^0$, $i=1, \ldots M$ are the weights of each classifier. The label of sample x may be given by $sgn[C_0(x)]$, which is the sign of the output.

In the online stage, the new training samples are collected and stored until there are a sufficient number of samples to effectively train another new model. The model trained by the i-th group of samples may be denoted as $C_i$, which is also an ensemble of $N_i$ weak classifiers, $$C_i(x) = \sum_{j=1}^{N_i} w_j^i L_j^i(x).$$

The final predicted label C can be made by a weighted combination of all the models available up until the current stage as follows $$C = \sum_{i=0}^{K} \{\beta_i C_i(x)\} = \sum_{i=0}^{K} \left\{ \beta_i \left[ \sum_{j=1}^{N_i} w_j^i L_j^i(x) \right] \right\},$$

where $\beta_i$ is the weight for each model $C_i$.

Figure 1:
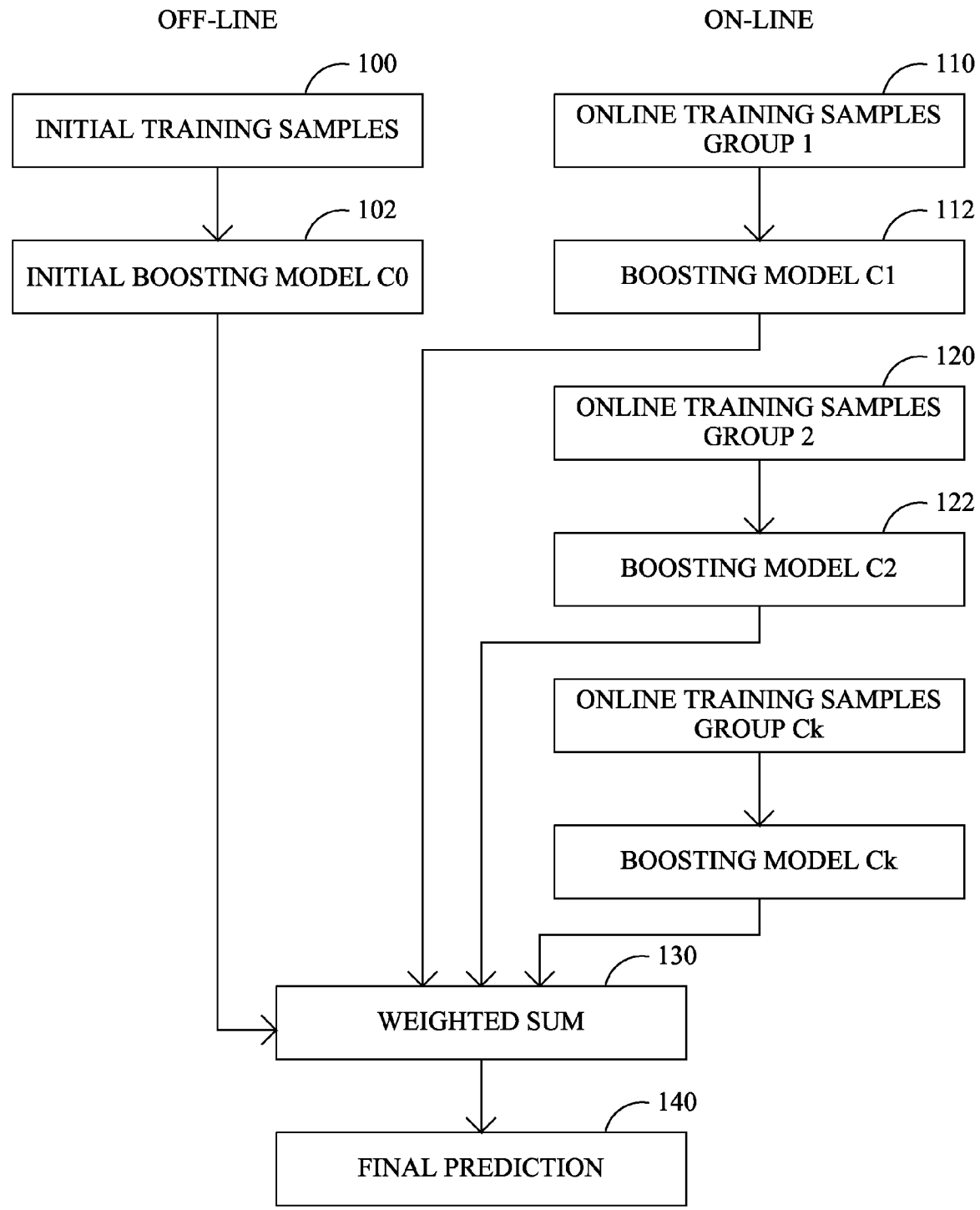
FIG. 1 illustrates an off-line and an on-line boosting technique.

Referring to FIG. 1, an exemplary framework for an on-line boosting technique described above is illustrated. An initial set of samples 100 are trained to determine an initial boosting model C0. As another group of images are obtained as a result of subsequent processing, a first group of additional training samples 110 are obtained to determine a first boosting model C1 112 based upon this group of images, and not the initial training samples 100 or initial boosting model C0 102. As a further group of images are obtained as a result of further subsequent processing, a second group of additional training samples 120 are obtained to determine a second boosting model C2 122 based upon this further group of images, and not the training samples 100/110 or boosting models C0/C1 102, 112. This process may be continued for additional groups of subsequent images. The result of the available boosting models C0, C1, ..., Ck may be combined using a weighted sum 130 to determine a final prediction 140.

Accordingly, all the models $C_i$, i=0, ... K may be trained with disjointed sets of training samples to utilize the models in a flexible manner. The weights can be determined by the importance of each group of samples, by the order that each group of samples arrives, removal of selected models determined to be of limited value, or any other suitable manner. This technique may be referred to as a voting mechanism, with each model acting as an expert, with the final results being determined by them together with different weights. The image buffer of the group of images may be cleared when the group is processed to determine a suitable model.

The on-line boosting technique may also update the existing model. In many cases, the optimal model that can be achieved for an online application would be the batch model re-trained with all the training samples available up until the current stage. To approach this goal, the online boosting technique may correspond to the batch boosting technique. The model trained with the initial training samples may be updated with the newly added samples, so that the updated model would be approximately the same as the batch model re-trained with all training samples.

By way of example, the input technique may be a group of weak classifiers learned so far $L_i^0$, i=1, ... M, a new training sample s to arrive (with $y_s$ as it's ground truth label), and an incremental learning technique which utilizes the new training sample to update the existing weak classifier BaseUpdate $(L_i^0, s)$. An exemplary set of details may be as follows.

Set the new sample's weight as $\lambda_s=1$;
For each weak classifier $L_i^0$, i=1, ... M:
Generate k according to $$\text{Poisson}\left(\frac{N\lambda_s}{W_i}\right);$$

Do k times: $L_i^0$=BaseUpdate($L_i^0$,s);
Set $$f_i(x) = \frac{1}{2} \log \frac{p_i(x)}{1 - p_i(x)},$$

in which $p_i(x)=P(y=1|s,L_i^0)$;
Update the new sample's weight: $\lambda_s \leftarrow \lambda_s \exp(-y_s f_i(s))$;
Update the summation of all samples' weights: $W_i = W_i + \lambda_s$;
The final prediction of a sample x can be made as $$\text{sgn}\left[\sum_{i=1}^{M} f_i(x)\right].$$

$W_i$ is the summation of the weights of all samples that have been used until the current stage (excluding the weight of new sample s), and N is the number of all past samples excluding the new sample s. When the new sample is misclassified by a weak classifier $L_i^0$, $-y_s f_i(s)$ would be positive, so the weight $\lambda_s$ associated with this sample is increased when presented to the next weak classifier; otherwise, the weight $\lambda_s$ will be decreased. The principal idea of the online boosting technique is to process the new sample as if it were already included in the initial training set, i.e., also passing it from the first weak classifier to the last, and modifying the sample's weight at each step before passing to the next classifier. By using such a technique the updating technique does not require the samples to arrive in a group; instead, it can process the samples one by one.

One or more online boosting techniques, such as the expanding models technique and/or the updating the initial model technique may be combined together to achieve improved performance. In the following, the expanded model is denoted as $M_E$ and the updated model is denoted as $M_U$.

If the positive samples and negative samples are unbalanced, the two models will focus on different aspects of the classification. Without losing generality, it is assumed that the number of negative samples is much larger than the number of positive samples, and that finding positive samples is more valuable. Then two different kinds of performance evaluation on positive samples may be defined: (1) recall is defined as the percentage of true positive samples found by the model in all the ground-truth positive samples; (2) precision is defined as the percentage of true positive samples found by the model in all the positive samples predicted by the model. In other words, the true defects are classified properly but also include a lot of non-defects classified improperly. Also, in other words, a lot of the true defects are improperly classified as non-defects and only a few true defects are classified as defects.

Experimental results have shown that $M_U$ will provide results with high positive recall but low precision, and $M_E$ will provide results with high precision and low recall. To get both high positive recall and high precision, these two models may be combined together. It is desirable to make a prediction of a test sample using $M_E$ and $M_U$ separately, and take their weighted sum as the final prediction $sgn(M_E(x)+M_U(x))$.

As the online stage proceeds, $M_E$ will be expanded, so that there will be more and more base weak classifiers in $M_E$. To make a prediction with $M_E$, all weak classifiers may be used to make the prediction, which might be time-consuming. Therefore, the use of a cascaded prediction may be used, which saves a lot of computational burden by avoiding using $M_E$ in many unnecessary cases.

Figure 2:
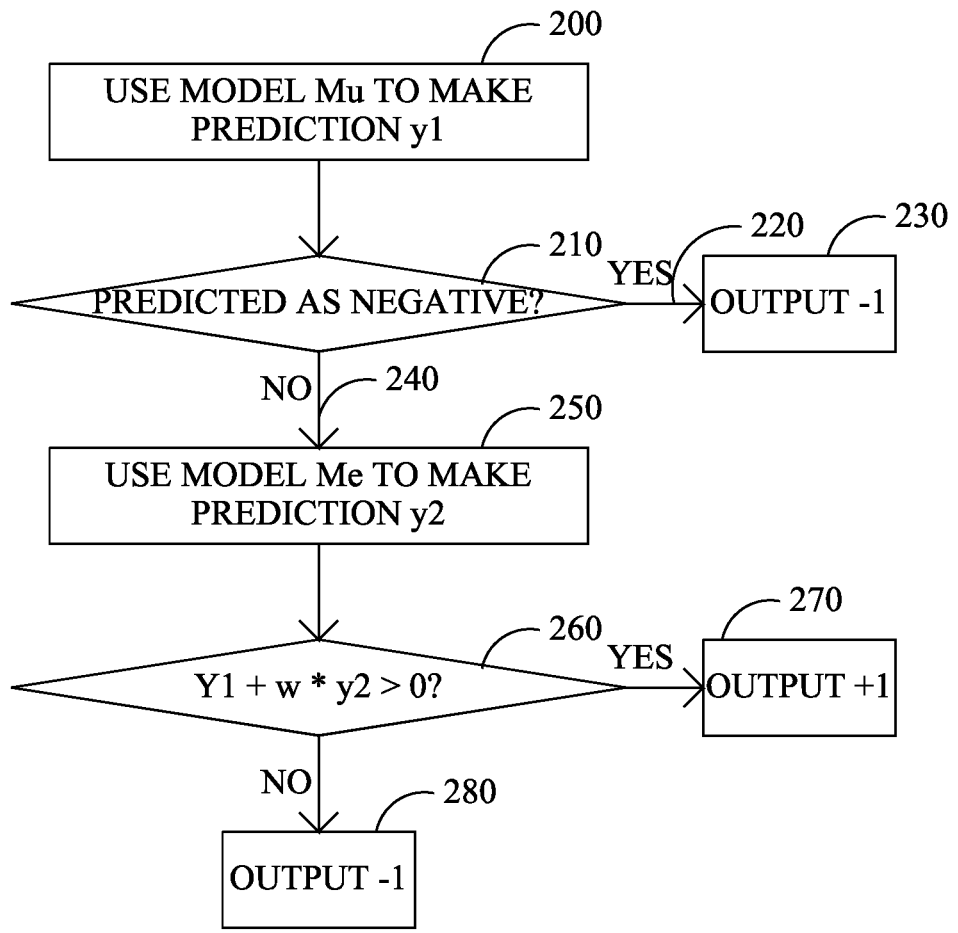
FIG. 2 illustrates a cascade prediction for on-line boosting.

The joint technique is further described referring to FIG. 2. First $M_U$ 200 is used to make a prediction 210. If the sample is predicted as negative 220, then the system may return −1 230 as the final output. In this case it is likely that the sample is a defect since $M_U$ tends this way. If the sample is predicted as positive 240, then model $M_E$ 250 is used to make another prediction 260. In this case, the prediction of $M_U$ is not that accurate so it is preferable to also use $M_E$ to obtain further characterization. The system then determines the weighted combination of the two predictions as the final positive output 270 or final negative output 280.

$M_U$ tends to provide results with high recall, which means, most of the positive samples will be included in those samples predicted as positive by $M_U$. That is to say, if a sample is predicted as negative by $M_U$, it's most likely that it is a true negative. If it's predicted as positive, it is not sure whether it's true positive or not; then combine it with the prediction result by model $M_E$ to make further confirmation. The model $M_E$ may be used primarily when a sample is predicted as positive in the first stage, which is a smaller fraction among all samples. Since the number of negative samples is larger than the number of positive samples, $M_U$ will be enough to make the prediction in many cases, and the time required to go through all weak classifiers in $M_E$ will be saved in many cases.

In the aforementioned techniques, the updating of the existing weak classifier $BaseUpdate(L_i^0,s)$ was described. The technique may be specific, if desired, to a particular type of baseline classifier. For example, if the decision tree is trained, and it is desirable to update it with a new sample, the system may first pass the sample from the root to corresponding branch according to the criteria at each internal node, and recalculate the "purity" score for each node. If the purity score of a node is not high enough, it should be re-split based on all previous samples and this new sample. Therefore, some information should be maintained about previous samples so that it's possible to recalculate the purity score of each node. For variables with discrete value, this statistical information can be obtained by counting the number of samples with each value; however, if the variable is real-valued, to precisely maintain the distribution information, all the previous feature values that have appeared should be stored for future use.

In online learning, when using a decision tree as the base classifier in the boosting model, and the feature of each sample is real-valued, all the feature values that have appeared would normally be stored to update the initial model, which is determined by the characteristics of decision tree. This is highly memory-consuming as the number of samples that must be stored keeps increasing. A more compact representation of the sample features is desirable in a manner that does not result in a significant loss of accuracy to reduce memory usage.

In the initial stage, the system obtains the representative samples of initial training samples by using a suitable technique, such as a K-means clustering technique on positive and negative samples separately. The cluster centers are selected as the representative samples, denoted as $\{\hat{x}_i, i=1, \ldots, n\}$ and their weights are taken as the number of samples in the corresponding cluster, denoted as $\{s_i, i=1, \ldots, n\}$.

In the online stage, the new training samples are added to the previous representative sample set $\{\hat{x}_i, i=1, \ldots, n\}$ with each new training sample assigned a weight of 1. A weighted k-means is performed on this enlarged set as follows:

(1) Randomly select n points as the initial cluster centers $\{center_i, i=1, \ldots n\}$;
(2) Assign each sample x to the nearest cluster center: if $$i = \operatorname*{argmin}_i \|x - center_i\|_2,$$

then $x \in C_i$.

(3) Re-calculate the cluster center by taking the weighted average of all samples in the cluster:

$$center'_i = \frac{\sum_{x_j \in C_i} s_j x_j}{\sum_{x_j \in C_i} s_j},$$

and the weight associated with the center is $$s'_i = \sum_{x_j \in C_i} s_j.$$

(4) Calculate the cluster error:

$$error = \sum_{i=1}^{n} \sum_{x_j \in C_i} s_j \|x_j - center_i\|_2^2;$$

(5) If the error is below some threshold, or doesn't change a lot compared with previous iteration, exit the algorithm, return the up-to-date cluster centers $\{center'_i, i=1, \ldots n\}$ and the associated weights $\{s'_i, i=1, \ldots n\}$ as the final compact representation of all samples;
(6) If the error doesn't converge, replace the old centers $\{center_i, i=1, \ldots n\}$ with new centers $\{center'_i, i=1, \ldots n\}$, and back to step 2.

Using this technique, the statistical distribution information contained in the entire sample set is dynamically maintained, while the memory footprint and the computational load is controlled as constant, proportional to the number of centers used in the K-means clustering technique. Although the compact represented is described with respect to updating decision trees, this representation is also useful for other types of classifiers, as long as the classifier is influenced by the data density.

In supervised learning as previously described, training samples may be "labeled" when used to train a statistical model. This means that the "ground-truth" class label of each sample is available at the time of training. For example, in a defect detection context, a sample may be labeled as either "defect" or "non-defect" in order to "teach" a statistical model/classifier. The labels may be provided by a human operator or expert. In many applications, obtaining the labeled samples for training are expensive, difficult and/or time-consuming. If a substantial number of unlabeled samples are available, these unlabeled samples may also be used to assist in improving the model, which reduces the burden associated with labeling the samples.

For applications where a limited number of labeled samples are available, but a large number of unlabeled samples are available, it may be desirable to use semi-supervised learning to exploit the useful information embedded in unlabeled samples. This means that samples that are not labeled, e.g. manually by an operator, may be used for training the statistical model of a classifier. This may be beneficial in many applications, since it may be relatively expensive (in terms of time or other resources) to provide labels for the purpose of training statistical classifiers.

In the online stage(s), if the incoming group of samples are labeled, the technique uses the supervised online boosting model described above, i.e. the initial model is updated and a new model is added. If the incoming group of samples are unlabeled, the system may use two models, namely, a newest added model and/or an updated initial model. Both models can predict the labels for these unlabeled samples, and the samples with the most confident labels are selected. Supposing the most confident labels are just the pseudo ground truth labels, each model will provide these samples and their labels to update the other model.

The samples used for training are usually labeled by experts; however, the labeling might be difficult, expensive or time-consuming, while the unlabeled samples are easier to collect. With limited amount of labeled samples, the obtained classifier might be biased or insufficient to distinguish different classes. Given the limited labeled samples, an effective technique to train a classifier should exploit the information in the large amount of unlabeled samples, which is generally well-known as semi-supervised learning.

A semi-supervised online learning boosting tree framework may make use of the information contained in a large amount of unlabeled data. Their distribution gives some information about the intrinsic connections between data points, but this information is hard to exploit using traditional supervised learning techniques, since the samples do not have class labels associated with them.

A semi-supervised technique, generally referred to as co-training may be utilized. By way of general description there are two different classifiers $M_0$ and $M_1$ trained on labeled samples. Firstly $M_0$ is used to provide (predict) labels for the unlabeled samples. Then, predicted samples with the most confident labels are selected, removed from the unlabeled set, and added to the labeled set associated with the predicted labels. $M_1$ is re-trained with the expanded labeled set. Then, the role of $M_0$ and $M_1$ is changed, and the above steps are repeated. In this stage, is re-trained based on predictions from the updated $M_1$. This co-training procedure may continue, until some convergence criteria is met.

Figure 3:
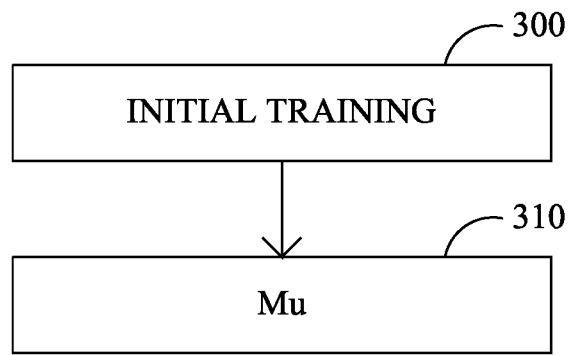
FIG. 3 illustrates an initial training model.

Referring to FIG. 3, with the initial training samples 300, the system has an initial model $M_U$ trained 310. In the subsequent stages, depending on the nature of the received samples, one or more techniques may be applied.

Figure 4:
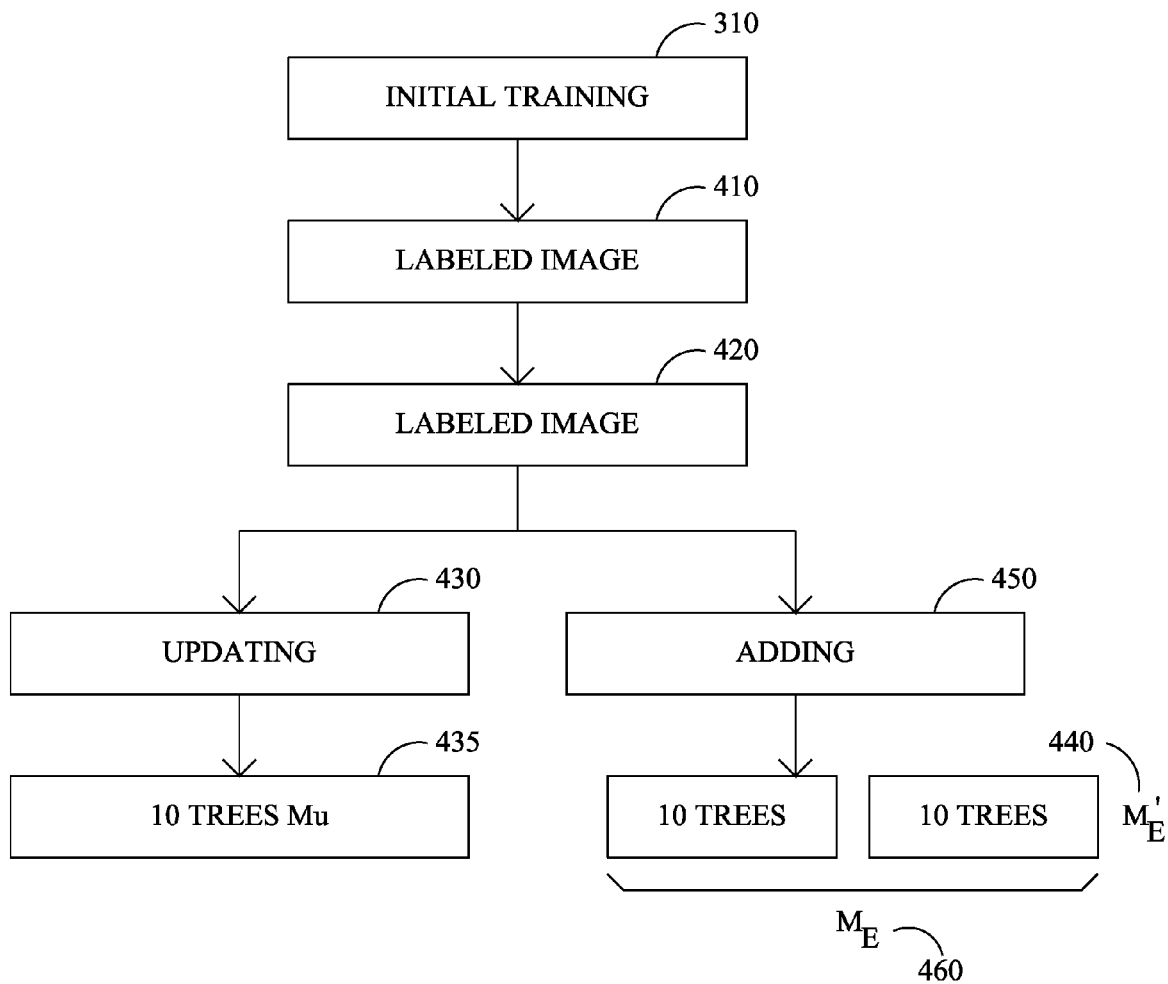
FIG. 4 illustrates on-line boosting with additional labeled samples.

Referring to FIG. 4, if the incoming group of samples 410, 420 is labeled, $M_U$ 435 may be updated 430 with these samples. In this manner, the initial model is updated based upon the subsequent samples, and therefore reflects the total set of available samples. A new boosting model $M^i_E$ 440 based upon a set of samples is added 450 to $M_E$ 460. In this manner, new boosting models are determined based upon the labeled images each of which is characteristic of the newly received samples, which are then combined with previous newly determined boosting models. In this manner, the system is more suitable to adjust to changes in the characteristics of the samples.

Figure 5:
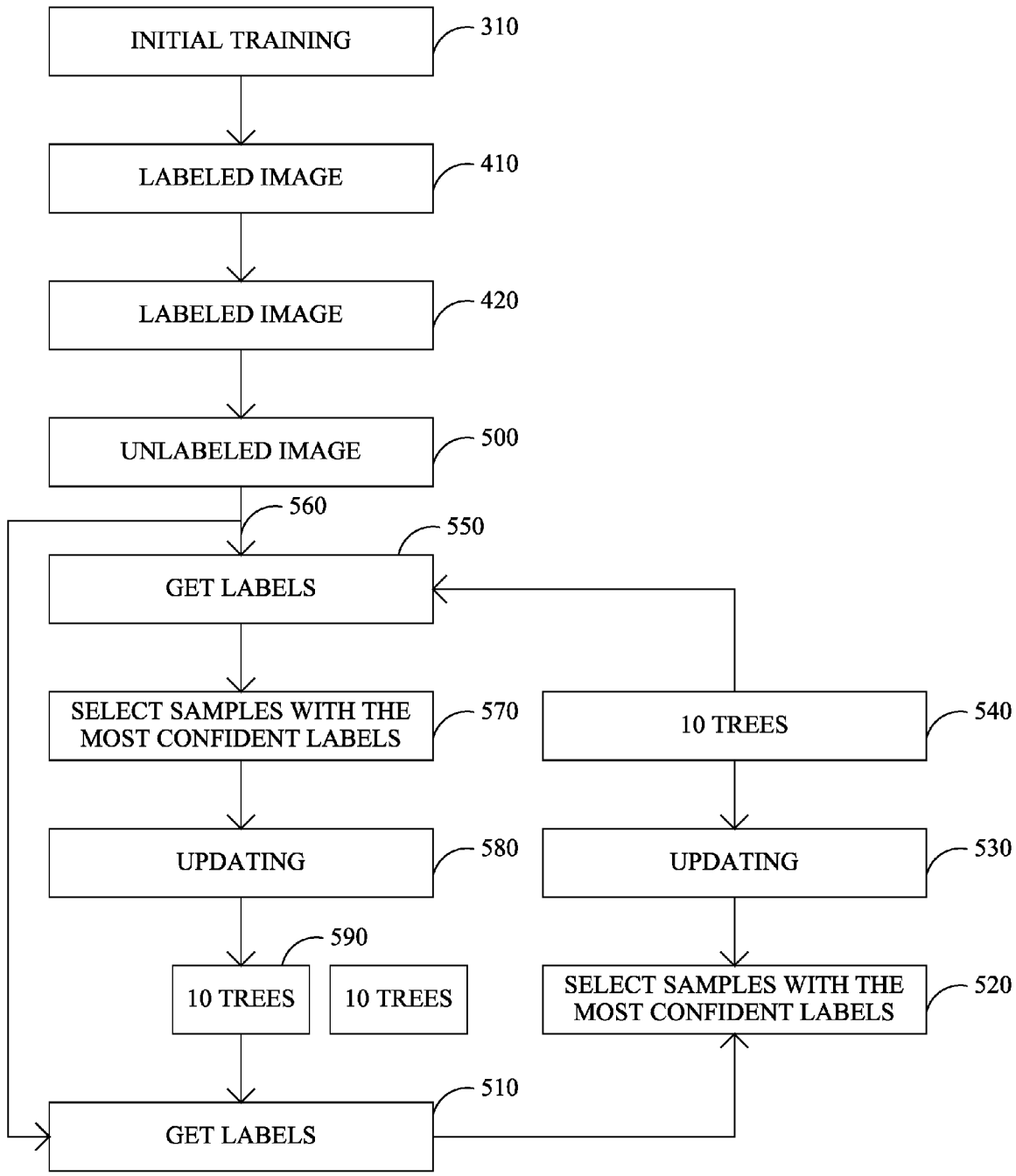
FIG. 5 illustrates on-line boosting with additional un-labeled samples.

Referring to FIG. 5, if the incoming group of samples is unlabeled 500, and the system has two models $M_U$ and $M_E$, then a co-training procedure may be carried out between $M_U$ and the most recently added model $M_E^j$ in $M_E$. In general, the technique predicts 510 the labels for all of the unlabeled samples. Based upon the prediction, the system selects the samples with the most confident labels 520. The model $M^U$ is updated 530 based upon the selected samples resulting in a set of updated models 540. Based upon the models 540 the system may predict the labels 550 for the unlabeled images 560. The prediction 550 may include the labels and a confidence measure. The samples with the most confident labels 570 may be selected as likely true labels. The model $M_E$ is updated 580 based upon the selected samples resulting in a set of updated models 590. This process may be repeated for additional unlabeled samples.

Figure 6:
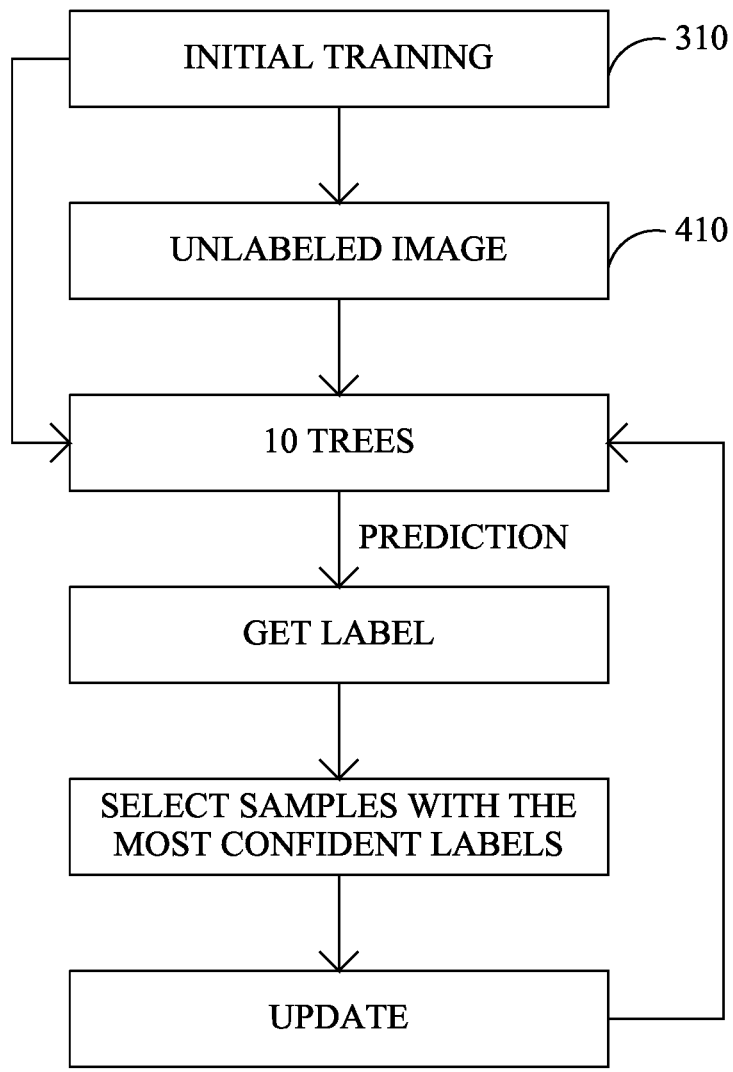
FIG. 6 illustrates on-line self-training.

Referring to FIG. 6, if the subsequent group of samples is unlabeled and the system only has model $M_U$, a self-training procedure may be carried out, which is similar to co-learning, with $M_U$ providing the most confident samples to itself.

If the online samples are arriving one by one instead of group by group, the system may use a buffer to store the labeled samples until there are enough labeled samples to train a new model to be added. There is no need to hold another buffer for unlabeled samples, since updating the existing model and the co-training framework can handle the samples one by one.

Figure 7:
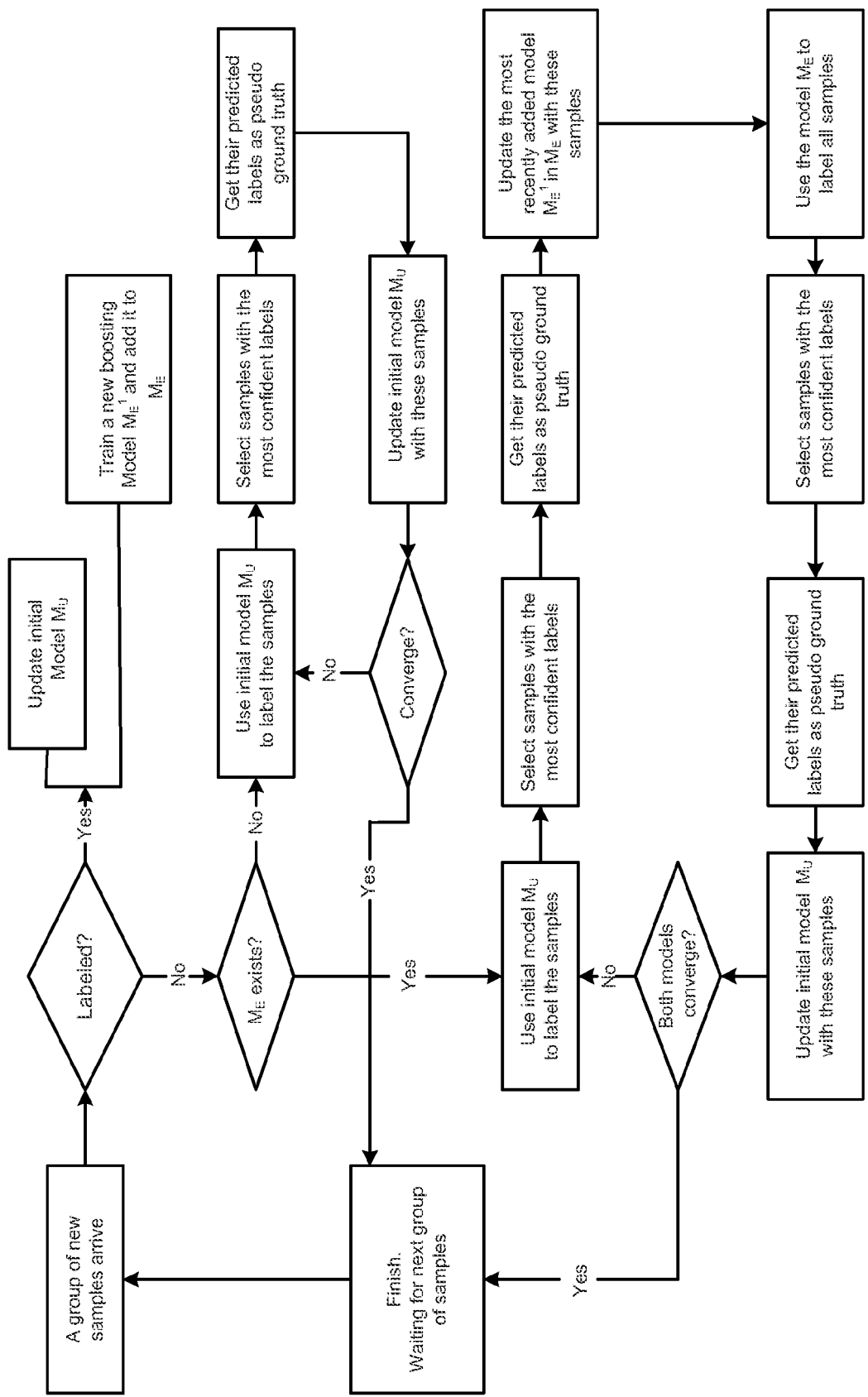
FIG. 7 illustrates a more comprehensive boosting technique.

FIG. 7 illustrates the resulting technique from combining FIG. 4, FIG. 5, and FIG. 6.

Figure 8:
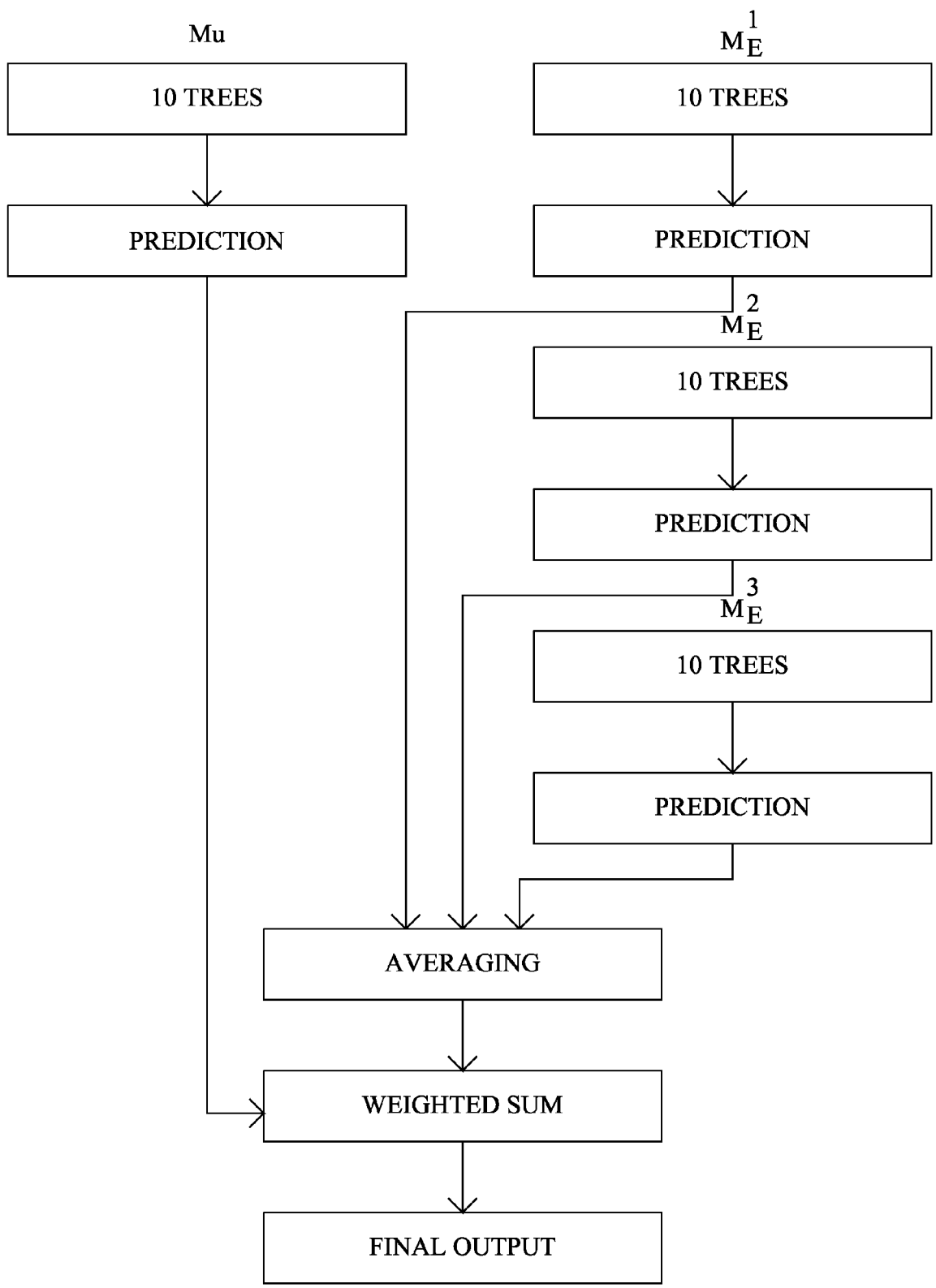
FIG. 8 illustrates semi-supervised prediction.

In the prediction of semi-supervised online learning, the initial model $M_U$ and each of $M_E^j$ produce a prediction label. Then these labels are combined by a weighted summation to generate the final predicted label. This prediction procedure is illustrated in FIG. 8.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An automated method for classification of samples performed by a processing device, said method comprising:
   (a) providing to said processing device a trained statistical model based upon a set of initial samples;
   (b) said processing device receiving a first set of samples, wherein each of said first set of samples includes a label thereof provided by a user indicating characteristics of each of said first set of samples, and each of said labels thereof includes an appended respective confidence measure provided by said user to the label of each labeled said sample;
   (c) said processing device training a first statistical model based upon selective ones of said first set of samples having a respective said appended confidence measure above a threshold, said first statistical model being of the same class as said trained statistical model;

(d) said processing device receiving a second set of samples that do not include a label thereof indicating characteristics of each of said second set of samples provided by said user and do not include for each of said labels an appended respective confidence measure provided by said user and updating said first statistical model based on said second set of samples;

(e) said processing device training a second statistical model based upon said second set of samples, said second statistical model being of the same class as said trained statistical model;

(f) wherein said trained statistical model, said first statistical model, and said second statistical model, are independent of each other and collectively used by said processing device to classify another sample.

2. The method of claim 1 wherein said trained statistical model is a boosting model.

3. An automated method for classification of samples performed by a processing device, said method comprising:

(a) providing to said processing device a first statistical model based upon a set of samples wherein its evaluation on positive samples has high positive recall with low precision;

(b) providing to said processing device a second statistical model based upon a set of samples wherein its evaluation on positive samples has high precision with low positive recall, where said recall is defined as a percentage of true positive samples found by the model in all the ground-truth positive samples;

(c) said processing device using said first statistical model to determine an initial classification of said sample;

(d) based upon said processing device using said first statistical model, said processing device selectively further classifying said sample using said second statistical model, and providing a final classification based on a weighted combination of the respective classifications of said first statistical model and said second statistical model.

4. The method of claim 3 wherein said classifying said sample based upon said first statistical model includes a first output indicating it is likely a defect and a second output indicating it is likely not a defect.

5. The method of claim 4 wherein said classifying said sample based upon said second statistic model is based upon said first output.

6. The method of claim 1 wherein said training said first statistical model is based upon a compact representation of said first set of samples.

7. The method of claim 1 wherein said training said first statistical model is based upon a compact representation of said first sample.

8. An automated method for classification of samples performed by a processing device, said method comprising:

(a) providing to said processing device an offline-trained initial statistical model, offline training based upon a set of initial, labeled samples;

(b) said processing device receiving a first set of labeled samples, and updating the initial statistical model using the labeled samples;

(c) said processing device training a first statistical model based upon said first set of labeled samples, said first statistical model being of the same class as said trained statistical model;

(d) said processing device sequentially receiving sets of second samples;

(e) said processing device:

(i) if a next-sequentially received set of second samples is labeled, updating the initial statistical model using the received set of second samples and training a next-sequential statistical model based on the received set of second samples; and (ii) if a next sequentially received set of second samples is unlabeled, employing a co-training procedure that uses the updated initial statistical model and the most recent next-sequential statistical model to predict labels for the received set of second samples with appended, automatically determined confidence measures associated with each predicted label;

(f) said processing device training a second statistical model based upon the labels of a sequentially received second set of samples, said second statistical model being of the same class as said offline-trained initial statistical model; and (f) wherein said offline-trained initial statistical model, said first statistical model, and said second statistical model, are independent of each other and collectively used by said processing device to classify another sample.

9. The automated method of claim 8 where the co-training procedure ends when a convergence criteria is met.

10. The automated method of claim 8 where, if a next-sequentially received set of second samples is labeled, updating at least one statistical model, other than said initial statistical model, using said second set of samples.

* * * * *